April 11, 1961 TAKEO NOJIMA 2,979,360
CAR WHEELS
Filed Aug. 25, 1959

INVENTOR:
TAKEO NOJIMA
BY
Richardson, David and Nardon
ATTY'S.

United States Patent Office 2,979,360
Patented Apr. 11, 1961

2,979,360

CAR WHEELS

Takeo Nojima, 542 Kosugi-cho 1-Chome,
Kawasaki City, Japan

Filed Aug. 25, 1959, Ser. No. 835,937

Claims priority, application Japan Sept. 2, 1958

3 Claims. (Cl. 295—44)

This invention relates to car wheels and more particularly to car wheels operative in aligned pairs without need of any axle connecting each pair of wheels in alignment.

The main object of the present invention is to provide car wheels with minimum frictional resistance against their rotation, together with maximum useful life and loading capacity.

Another object of the present invention is to provide car wheels which make the over-all height of the truck or the height of car floor from ground minimum.

A further object of the present invention is to provide car wheels which can carry car load directly or not through any axle.

These and other objects and particularities of the present invention will best be understood from the following detailed descriptions with reference to the accompanying drawings, in which.

Figure 1:
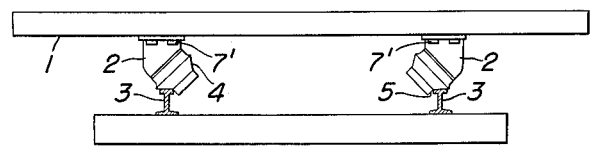
Fig. 1 is a diagrammatic end view of a car truck provided with car wheels embodying the present invention.

Referring to Fig. 1, the truck member 1 of a car is mounted on and supported directly by a plurality of aligned pairs of wheels 2 ride on a pair of rails 3 and engage them at treads 4 and flanges 5 as in conventional railway car wheels.

Since all the wheels 2 are of the same construction except that the opposite side wheels have their axes of rotation inclined to the vertical in opposite senses, it will be sufficient to describe one wheel 2 in detail.

Figure 2:
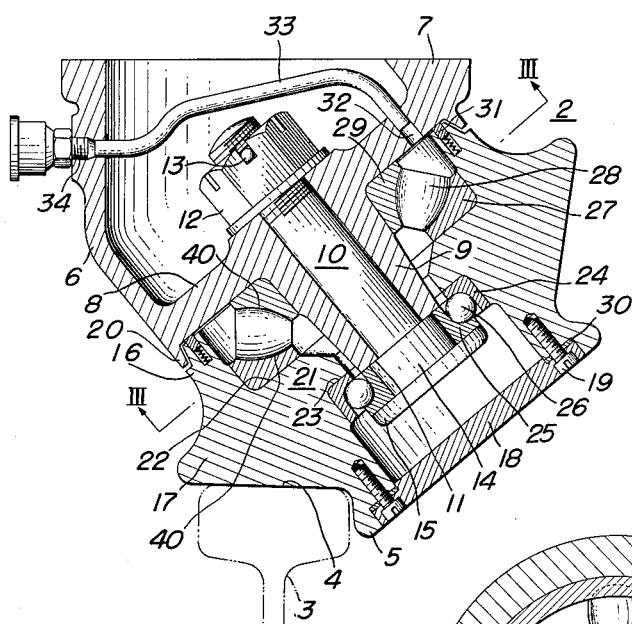
Fig. 2 is a vertical central sectional view of a car wheel embodying the present invention.
Figure 3:
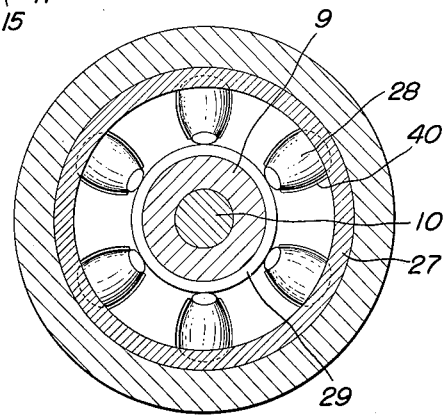
Fig. 3 is a cross-sectional view taken substantially at line III—III in Fig. 2.

Referring to Figs. 2 and 3, the wheel 2 comprises a cylindrical body 6 of generally triangular longitudinal section. The body 6 has a horizontal top end provided with fastening flange 7 through which a plurality of fastening bolts 7' secure the body 6 to the truck member 1.

The body 6 has its bottom wall 8 inclined to the horizon by an angle from about 30° to about 40°, and is provided at the centre of bottom wall 8 with a bore surrounded by a cylindrical sleeve 9 projecting downwards from the wall at a right angle thereto.

A centre bolt 10 passes through the bore of sleeve 9. The bolt 10 has its lower end enlarged to form a shoulder 11 to abut the lower end face of sleeve 9, and is provided at the upper end portion with screw thread, with which a nut 12 engages to secure the bolt 10 to the body 6. The nut 12 is locked by a cotter pin 13 against loosening.

The enlarged lower end portion 14 of centre bolt 10 has a cylindrical form, and its bottom end is further enlarged to provide a race support 15.

A hollow wheel member 16 has a frusto-conical tread portion 17 converging downwards and provides substantially conical tread 4 which engages rail 3. The lower end of tread portion 17 is continued by the flange portion 5 adapted to prevent derailing. The bottom opening of wheel member 16 surrounded by flange portion 5 is closed by a cover plate 18 fixed to the member by screws 19.

The wheel member 16 has its upper portion converged upwards to merge in the bottom end of wheel body 6. The bottom end of body 6 is provided with downwardly extending flange 20, and the top end of wheel member 16 is reduced in diameter to fit inside the flange 20.

The hollow wheel member 16 has an inner shelf portion 21 which provides an upper annular shoulder 22 and a lower annular shoulder 23. The lower shoulder 23 forms a race support opposite the race support 15 on the center bolt 10, and holds an upper annular race 24 which cooperates with a lower annular race 25 held in position by the race support 15, to support and guide a plurality of steel balls 26 arranged in a circle therebetween.

In order to enable the assembling of the above-mentioned parts, the race support 15 may be made detachable with respect to the lower cylindrical portion 14 of centre bolt 10 by suitable means, not shown. The bearing faces of the races 24 and 25 are of generally angular configuration, but have partly circular cross-sectional shape adapted to cooperate with steel balls 26. Thus the wheel member 16 is held in place on the centre bolt 10. It is to be noted that the bearing assemblage 24—25—26 merely serves to guide the wheel member 16 and hold the same against falling out, but is not loaded at all during operation.

On the upper annular shoulder 22 is mounted a lower bearing ring 27 for a plurality of loading steel rollers 28 arranged in a circle. An upper bearing ring 29 is held in place at the corner formed by the bottom wall 8 and the cylindrical sleeve 9 of the wheel body 6.

Each roller 28 must have a special shape generally similar to a cop, with its longitudinal axis coincident with line of generation of an imaginary conical surface having its point on the axial line of centre bolt 10 at a point near its lower end, as shown in Fig. 2 by broken lines.

The roller 28 is not a circular cylinder, but its line of generation must be an arc of a great circle of a sphere, and the outer or upper end has a diameter larger than the inner or lower end.

Each roller 28 is rotatably held in position by being received in a pair of opposite recesses 40 formed in bearing rings 27 and 29, respectively. A plurality of such pairs of recesses 40 are provided in bearing rings 27 and 29, correspondingly in number to the total number of rollers 28. Each recess 40 has a bearing face coincident with a portion of the peripheral surface of roller 28, and the roller 28 makes substantially full surface contact with the bearing face of recess 40.

With the arrangement described above, I have found that the rollers 28 operate with their maximum capacity to support the load applied thereon, while minimizing the frictional resistance against rotation of the wheel. In addition, contrary to an arrangement employing spherical balls in place of rollers 28, where the balls make point contact with bearing faces, the useful life of my wheel is extremely long by virtue of the surface contact between rollers 28 and bearing rings 27 and 29.

It is to be noted that the circular rows of balls 26 and rollers 28, are, respectively, in planes perpendicular to the axis of the centre bolt 10.

The chamber defined in the wheel member 16 is filled with lubricating medium such as grease, and suitable packing means 30 and oil seal means 31 are provided at appropriate places. The grease may be fed into the chamber through a hole 32 formed in the wall 8 and connected to a copper pipe 33 from a grease cap 34 of conventional construction.

The above description has been given merely for the purpose of explanation, but not for limitation, and it is to be understood that the new car wheel according to the invention has been provided in practice having minimum frictional resistance (about one tenth the frictional resistance of conventional ball or roller bearing car wheels) again rotation.

What I claim as my invention is:

1. A car wheel comprising a stationary body having a cylindrical sleeve projecting downwardly therefrom at an angle about 30 to 40 degrees with respect to the vertical, a generally frusto-conical hollow wheel member having a conical tread with its axis coincident with that of said cylindrical sleeve, a center bolt passing through and secured to said cylindrical sleeve, means on said center bolt for holding said wheel member in place and rotatably about said center bolt, a pair of cooperating bearing rings respectively provided on said body and said wheel member, and a plurality of cop-shaped solid rollers held between said bearing rings and arranged in a circle, said bearing rings each having a series of circumferentially spaced recesses formed therein in their opposed faces, said rollers each being partially received in a recess of each of said bearing rings, said circle of rollers being in a plane perpendicular to said axis, and the longitudinal axes of said rollers conjointly forming a portion of an imaginary conical surface having its point on said axis near the lower end of said center bolt.

2. The car wheel according to claim 1, wherein each of said rollers has line of generation formed by a portion of great circle of a sphere.

3. The car wheel according to claim 1, wherein said means for holding said wheel member in place comprises a pair of cooperating annular races respectively provided on said centre bolt and said wheel member, and a plurality of solid balls disposed between said pair of races and arranged in a circle which is perpendicular to said axis and positioned below said circle of solid rollers.

References Cited in the file of this patent

UNITED STATES PATENTS

| 554,644 | Belk | Feb. 18, 1896 |
| 1,409,133 | Buckwalter | Mar. 7, 1922 |
| 1,789,007 | Leon | Jan. 13, 1931 |

FOREIGN PATENTS

| 385,386 | Great Britain | Dec. 29, 1932 |